United States Patent
Song (10) Patent No.: US 11,854,382 B2
(45) Date of Patent: Dec. 26, 2023

(54) AUDIO/VIDEO TRANSMITTING DEVICE AND AUDIO/VIDEO RECEIVING DEVICE

(71) Applicant: LG ELECTRONICS INC., Seoul (KR)

(72) Inventor: Daesub Song, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 119 days.

(21) Appl. No.: 17/449,712

(22) Filed: Oct. 1, 2021

(65) Prior Publication Data

US 2023/0074767 A1 Mar. 9, 2023

(30) Foreign Application Priority Data

Sep. 9, 2021 (WO) ................ PCT/KR2021/012261

(51) Int. Cl.
*G08C 23/04* (2006.01)
*H04L 12/10* (2006.01)
*H04B 1/06* (2006.01)

(52) U.S. Cl.
CPC ............... *G08C 23/04* (2013.01); *H04B 1/06* (2013.01); *H04L 12/10* (2013.01)

(58) Field of Classification Search
CPC .......... G08C 23/04; H04B 1/06; H04L 12/10; H04N 21/43637; H04N 21/43615; H04N 19/85; H04N 21/436
See application file for complete search history.

(56) References Cited

U.S. PATENT DOCUMENTS

| | | | | |
|---|---|---|---|---|
| 5,805,201 A | * | 9/1998 | Fujiwara | .......... H04N 21/42221 348/E5.127 |
| 9,071,793 B2 | * | 6/2015 | Choi | ................ H04N 21/43637 |
| 9,797,999 B2 | | 10/2017 | Lee et al. | |
| 10,096,237 B2 | | 10/2018 | Lee et al. | |
| 10,623,799 B2 | * | 4/2020 | Lee | ................... H04N 21/42208 |
| 10,869,079 B2 | | 12/2020 | Lee et al. | |

(Continued)

FOREIGN PATENT DOCUMENTS

| KR | 2010-0086712 | 8/2010 |
|---|---|---|
| KR | 10-2016-0009346 | 1/2016 |

(Continued)

OTHER PUBLICATIONS

PCT International Application No. PCT/KR2021/012261, International Search Report dated May 30, 2022, 3 pages.

*Primary Examiner* — Adnan Aziz
(74) *Attorney, Agent, or Firm* — LEE, HONG, DEGERMAN, KANG & WAIMEY PC (57) ABSTRACT

An Audio/Video (A/V) receiving device includes a Radio Frequency (RF) receiving module configured to receive A/V data from an A/V transmitting device through a first frequency band, an infrared (IR) module configured to receive a power control signal from a remote control device, a wireless receiving module configured to communicate with a wireless transmitting module of the A/V transmitting device through a second frequency band, and a microcomputer configured to turn on power of the A/V receiving device according to the power control signal received from the remote control device and to transmit the power control signal to the wireless transmitting module through the wireless receiving module.

11 Claims, 9 Drawing Sheets

(56) References Cited

U.S. PATENT DOCUMENTS

| | | | |
|---|---|---|---|
| 2004/0193647 A1* | 9/2004 | Ueda | H04N 21/4122 |
| 2005/0186988 A1* | 8/2005 | Lim | H04N 21/47217 |
| | | | 455/3.06 |
| 2007/0199029 A1* | 8/2007 | Kim | H04N 21/42204 |
| | | | 348/E5.127 |
| 2013/0318265 A1* | 11/2013 | Lee | G06F 13/42 |
| | | | 710/106 |
| 2014/0092315 A1* | 4/2014 | Ikeda | H04N 21/42204 |
| | | | 348/734 |
| 2014/0267934 A1* | 9/2014 | Hardin | H04N 21/42221 |
| | | | 348/734 |
| 2014/0289782 A1* | 9/2014 | Kawasaki | H04N 5/38 |
| | | | 725/81 |
| 2015/0208345 A1* | 7/2015 | Weissman | H04W 52/0209 |
| | | | 455/574 |
| 2015/0334333 A1* | 11/2015 | Kuwahara | H04N 21/485 |
| | | | 348/552 |
| 2016/0054436 A1* | 2/2016 | Lee | G09G 3/20 |
| | | | 345/87 |
| 2018/0184164 A1* | 6/2018 | Petruzzelli | H04N 21/440218 |
| 2019/0379467 A1* | 12/2019 | Neumeier | H04B 17/30 |
| 2022/0353433 A1* | 11/2022 | Marino | G06F 3/167 |

FOREIGN PATENT DOCUMENTS

| | | |
|---|---|---|
| KR | 10-2016-0022162 | 2/2016 |
| KR | 10-2018-0034093 | 4/2018 |
| KR | 2019-0042373 | 4/2019 |
| KR | 20190042373 A * | 4/2019 |

* cited by examiner

AUDIO/VIDEO TRANSMITTING DEVICE AND AUDIO/VIDEO RECEIVING DEVICE

CROSS-REFERENCE TO RELATED APPLICATIONS

Pursuant to 35 U.S.C. § 119, this application claims the benefit of an earlier filing date and right of priority to International Application No. PCT/KR2021/012261, filed on Sep. 9, 2021, the contents of which is hereby incorporated by reference herein in its entirety.

BACKGROUND OF THE INVENTION

1. Field of the Invention

The present disclosure relates to a wireless display system for wirelessly transmitting and receiving audio/video (A/V) data.

2. Discussion of the Related Art

As image technology changes from analog to digital, development has been made from SD (Standard-Definition) to HD (Hi-Definition) to provide images closer to a real scene. SD supports a resolution of 704×480 and consists of about 350,000 pixels. HD is classified into HD and Full HD. Among them, Full HD supports a resolution of 1920×1080 and consists of 2 million pixels to provide a significantly higher quality image compared to SD.

Recent image technology is growing one step further to Ultra High-Definition (UHD) beyond Full HD. UHD, which supports high image quality and ultra-high resolution, is spotlighted as a next-generation media environment. The UHD supports 4K (3840×2160) and 8K (7680×4320) resolutions and surround audio of up to 22.2 channels. Compared to the HD, the UHD provides 4 times higher picture quality than the 4K UHD, and the 8K UHD provides 16 times higher picture quality than the HD.

Recently, a wireless display system that wirelessly transmits such a high-resolution image to a display device has emerged.

The wireless display system is a system for transmitting and receiving A/V data between an A/V transmitting device and an A/V receiving device through a local area network.

The A/V receiving device displays A/V data received from the A/V transmitting device.

Wireless connection for video/audio transmission between the A/V transmitting device and the A/V receiving device can be possible only when the A/V transmitting device is activated (powered on), and high power consumption is required. Therefore, wireless connection for video/audio transmission may be established in a power standby state.

In this case, since a remote control input signal or other power on signal is input to each of the A/V transmitting device and the A/V receiving device, there is inconvenience in use.

SUMMARY OF THE INVENTION

An object of the present disclosure is to synchronize input signals of remote control devices between a transmitting device and a receiving device in a wireless display system.

An object of the present disclosure is to improve convenience in power operation between a transmitting device and a receiving device in a wireless display system.

According to an embodiment of the present disclosure, an Audio/Video (AN) receiving device includes a Radio Frequency (RF) receiving module configured to receive A/V data from an A/V transmitting device through a first frequency band, an infrared (IR) module configured to receive a power control signal from a remote control device, a wireless receiving module configured to communicate with a wireless transmitting module of the A/V transmitting device through a second frequency band, and a microcomputer configured to turn on power of the A/V receiving device according to the power control signal received from the remote control device and to transmit the power control signal to the wireless transmitting module through the wireless receiving module.

According to another embodiment of the present disclosure, an Audio/Video (A/V) transmitting device includes a Radio Frequency (RF) transmitting module configured to transmit A/V data to an A/V receiving device through a first frequency band, a wireless transmitting module configured to communicate with a wireless receiving module of the A/V receiving device through a second frequency band, and a processor configured to turn on power of the A/V transmitting device when a power control trigger is detected and to transmit a power on signal to the wireless receiving module through the wireless transmitting module.

DETAILED DESCRIPTION OF THE PREFERRED EMBODIMENTS

Hereinafter, embodiments of the present disclosure will be described in detail with reference to the drawings. The suffixes "module" and "unit or portion" for components used in the following description are merely provided only for facilitation of preparing this specification, and thus they are not granted a specific meaning or function.

An audio/video (hereinafter, A/V) transmitting device according to an embodiment of the present disclosure is, for example, an intelligent device in which a computer support function is added to a broadcast reception function. The A/V transmitting device may perform the Internet function in addition to the broadcast reception function and may be equipped with a more user-friendly interface such as a handwritten input device, a touch screen or a spatial remote control device.

In addition, the A/V transmitting device may be connected to the Internet and a computer with the support of a wired or wireless Internet function and therefore, also perform functions such as e-mail, web browsing, banking, or games. A standardized general-purpose OS may be used for these various functions.

Accordingly, in the A/V transmitting device described in the present disclosure, for example, various applications may be freely added or deleted on a general-purpose OS kernel, so that various user-friendly functions may be performed.

Figure 1:
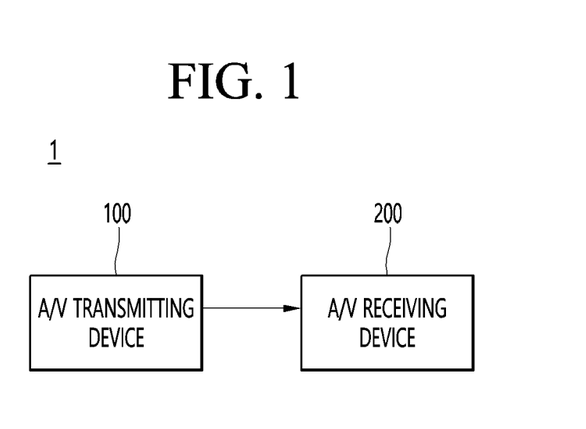
FIGS. 1 and 2 are diagrams for describing a configuration of a display system according to an embodiment of the present disclosure.
Figure 2:
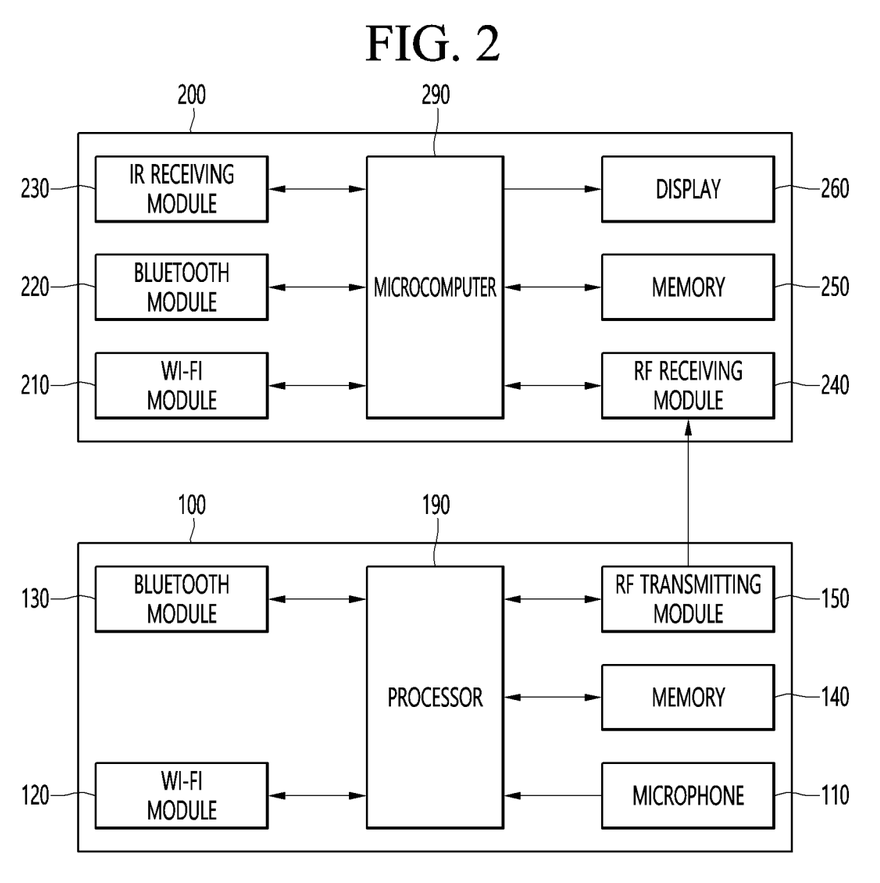

FIGS. 1 and 2 are diagrams for describing a configuration of a wireless display system according to an embodiment of the present disclosure.

Referring to FIG. 1, a wireless display system 1 according to an embodiment of the present disclosure may include an A/V transmitting device 100 and an A/V receiving device 200.

The wireless display system 1 may be a system in which the A/V transmitting device 100 wirelessly transmits A/V data to the A/V receiving device 200, and the A/V receiving device 200 outputs the A/V data.

The A/V transmitting device 100 may be a device capable of encoding video and audio and transmitting the encoded content video and audio in a wireless manner.

The A/V transmitting device 100 may be a set-top box.

The A/V transmitting device 100 may be connected to an external device such as a set-top box or a USB memory. The A/V transmitting device 100 may transmit a video signal or an audio signal received from the connected external device to the A/V receiving device 200.

The A/V receiving device 200 may be a display device capable of wirelessly receiving an encoded video and audio and decoding the received video and audio.

The A/V transmitting device 100 and the A/V receiving device 200 may constitute a video wall display system.

In a video wall, a display having a thin bezel plays an important role in the visualization of content images. For a thin bezel of a display, it is efficient that components capable of minimal functions are only provided and a circuit or a component for a main function is provided in a separate device.

The A/V transmitting device 100 may determine a type of the content video input from the outside and determine a compression radio of the content video based on the determined type. The compression rate of the content video may be defined as a ratio between the size of video data before encoding and the size of video data after encoding.

The type of the content image may include a still image type, a general video type, and a game video type.

The A/V transmitting device 100 may compress the content video according to the determined compression ratio, and wirelessly transmit the compressed content video to the A/V receiving device 200.

The A/V receiving device 200 may restore the compressed content video received from the A/V transmitting device 100 and display the restored content video on the display.

FIG. 2 is a block diagram illustrating detailed configurations of the A/V transmitting device 100 and the A/V receiving device 200.

Referring to FIG. 2, the A/V transmitting device 100 may include a microphone 110, a Wi-Fi module 120, a Bluetooth module 130, a memory 140, an RF transmitting module 150, and a processor 190.

The microphone 110 may receive an audio signal and transmit the audio signal to the processor 190.

The microphone 110 may receive a speech uttered by a user.

The Wi-Fi module 120 may perform wireless communication through the Wi-Fi standard. The Wi-Fi module 120 may perform wireless communication with an external device or the A/V receiving device 200 through the Wi-Fi standard.

The Bluetooth module 130 may perform wireless communication through a Bluetooth Low Energy (BLE) standard.

The Bluetooth module 130 may perform wireless communication with an external device such as a remote control device or the A/V receiving device 200 through a Bluetooth Low Energy (BLE) standard.

The memory 140 may store a program for signal processing and control and store a signal-processed video, audio, or data signal.

The memory 140 may perform a function for temporarily storing video, audio, or data signals input from the outside, and store information on a predetermined image through a channel storage function.

The RF transmitting module 150 may transmit an A/V signal to the RF receiving module 240 of the A/V receiving device 200 through radio frequency (RF) communication.

The RF transmitting module 150 may include one or more antennas.

The RF transmitting module 150 may transmit a compressed A/V signal in a digital form to the RF receiving module 240.

The RF transmitting module 150 may transmit an A/V signal to the RF receiving module 240 through one or more channels.

The processor 190 may control overall operation of the A/V transmitting device 100. The processor 190 may be configured in the form of a system on chip (SoC).

A plurality of processors 190 may be provided.

The processor 190 may compress a video signal or an audio signal input from the outside, and transmit the compressed signal to the RF transmitting module 150.

The processor 190 may include an encoder for compressing a video signal or an audio signal.

The processor 190 may be referred to as a main SoC.

The processor 190 may include one or more interfaces for connection with an external device. For example, the processor 190 may include one or more HDMI ports and one or more USB ports.

The processor 190 may include a tuner for receiving a broadcast signal.

The A/V receiving device 200 may include a Wi-Fi module 210, a Bluetooth module 220, an IR module 230, an RF receiving module 240, a memory 250, a display 260, and a microcomputer 290.

The Wi-Fi module 210 may perform wireless communication through the Wi-Fi standard.

The Wi-Fi module 120 may perform wireless communication with an external device or the A/V transmitting device 100 through a Wi-Fi standard.

The Bluetooth module 130 may perform wireless communication through a Bluetooth Low Energy (BLE) standard.

The Bluetooth module 220 may perform wireless communication with an external device such as a remote control device or the A/V transmitting device 100 through a Bluetooth Low Energy (BLE) standard.

The IR module 230 may receive a signal from the remote control device 300 to be described later through IR (Infrared) communication.

The RF receiving module 240 may receive an A/V signal from the RF transmitting module 150.

The RF receiving module 240 may include a plurality of antennas. The RF receiving module 240 may be disposed at the lower end of the display 260.

The RF receiving module 240 may include a first antenna module and a second antenna module. Each of the first antenna module and the second antenna module may include a plurality of antennas.

The RF receiving module 240 may receive a compressed A/V signal in digital form from the RF transmitting module 150 and transmit the received A/V signal to the microcomputer 290.

The memory 250 may store a program for signal processing and control and store a signal-processed video, audio, or data signal.

The display 260 may display a video signal received from the microcomputer 290.

The display 260 may display the video signal according to driving of a timing controller (not shown).

The microcomputer 290 may control the overall operation of the A/V receiving device 200.

The microcomputer 290 may restore the compressed A/V signal received by the RF receiving module 240. To this end, the microcomputer 290 may include a decoder.

Figure 3:
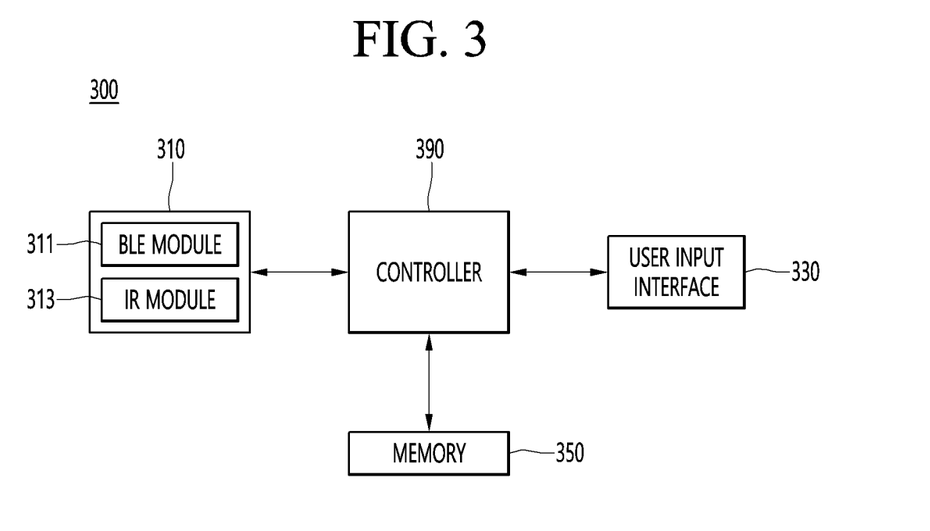
FIG. 3 is a block diagram for describing a configuration of a remote control device according to an embodiment of the present disclosure.

FIG. 3 is a block diagram for describing a configuration of a remote control device according to an embodiment of the present disclosure.

Referring to FIG. 3, a remote control device 300 may include a wireless communication interface 310, a user input interface 330, a memory 350, and a controller 390.

The wireless communication interface 310 may be an interface for performing wireless communication with the A/V transmitting device 100 or the A/V receiving device 200.

The wireless communication interface 310 may include a Bluetooth Low Energy (BLE) module 311 and an IR (Infra-Red) module 313.

The BLE module 311 may transmit a signal for controlling the operation of the A/V transmitting device 100 to the A/V transmitting device 100.

The BLE module 311 may transmit a signal for triggering a pairing operation of the A/V transmitting device 100 to the A/V transmitting device 100.

The user input interface 330 may include a keypad, a button, a touch pad, a touch screen, or the like.

The user input interface 330 may generate a control command for controlling the operation of the A/V transmitting device 100 or the A/V receiving device 200 according to a user's operation command.

When the user input interface 330 includes a hard key button, the user may operate the hard key through an operation of pushing the hard key button.

The user input interface 330 may include various types of input means that can be operated by the user, such as a scroll key or a jog key.

The memory 350 may store a program for the operation of the controller 390 and may temporarily store input/output data.

The controller 390 may control operation related to an application program and generally control overall operation of the remote control device 300.

Figure 4:
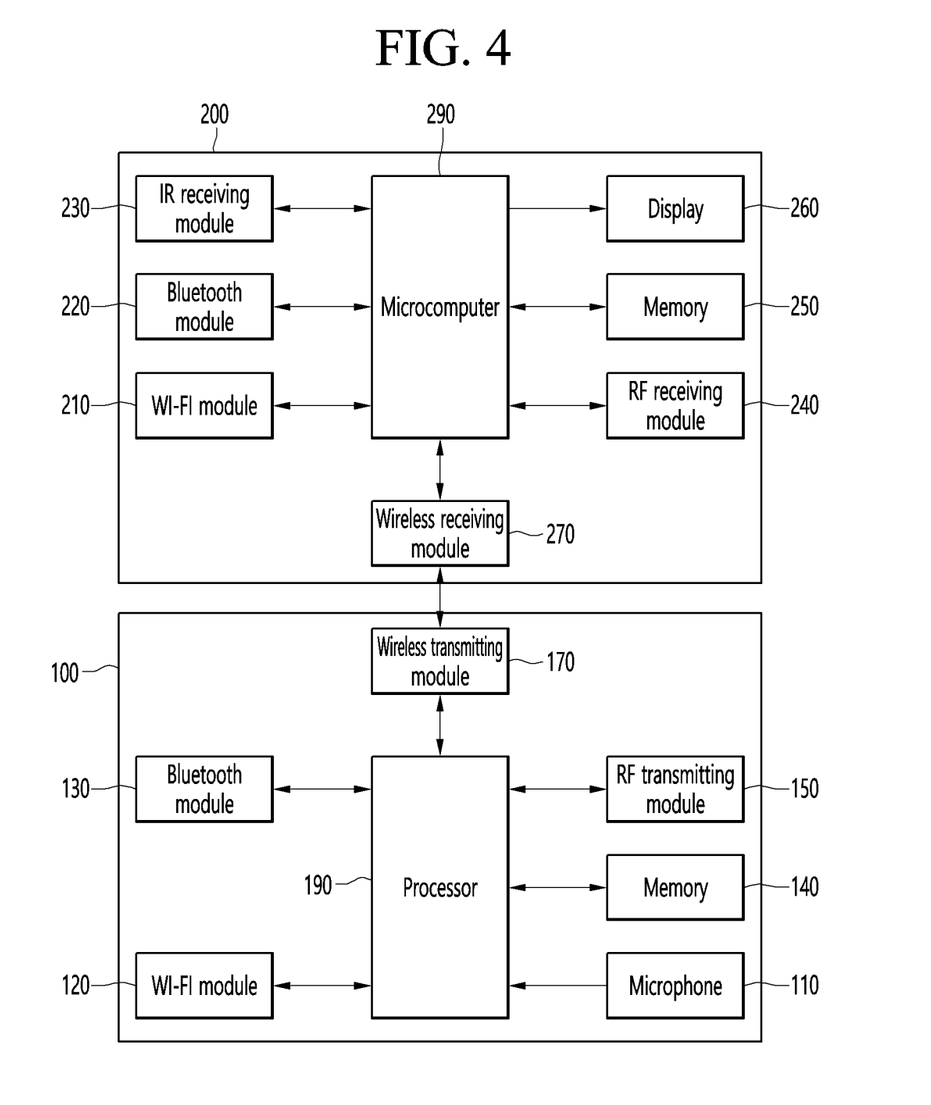
FIG. 4 is a block diagram for describing an A/V transmitting device and an A/V receiving device according to another embodiment of the present disclosure.

FIG. 4 is a block diagram for describing an A/V transmitting device and an A/V receiving device according to another embodiment of the present disclosure.

The A/V transmitting device 100 may include a wireless transmitting module 170 in addition to the components shown in FIG. 2.

The A/V receiving device 200 may include a wireless receiving module 270 in addition to the components shown in FIG. 2.

Each of the wireless transmitting module 170 and the wireless receiving module 270 may exchange signals with low power.

Each of the wireless transmitting module 170 and the wireless receiving module 270 may be a low-power Bluetooth module or RF module.

When each of the wireless transmitting module 170 and the wireless receiving module 270 is an RF module, frequency bandwidth used when transmitting A/V data between the RF transmitting module 150 and the RF receiving module 240 may be different.

For example, frequency bandwidth used when transmitting A/V data between the RF transmitting module 150 and the RF receiving module 240 may be 60 GHz and frequency bandwidth used to exchange signals between the wireless transmitting module 170 and the wireless receiving module 270 may be 2.4 GHz.

The wireless transmitting module 170 and the wireless receiving module 270 may transmit and receive a power control signal to each other. The power control signal may be a power on or power off signal.

Figure 5:
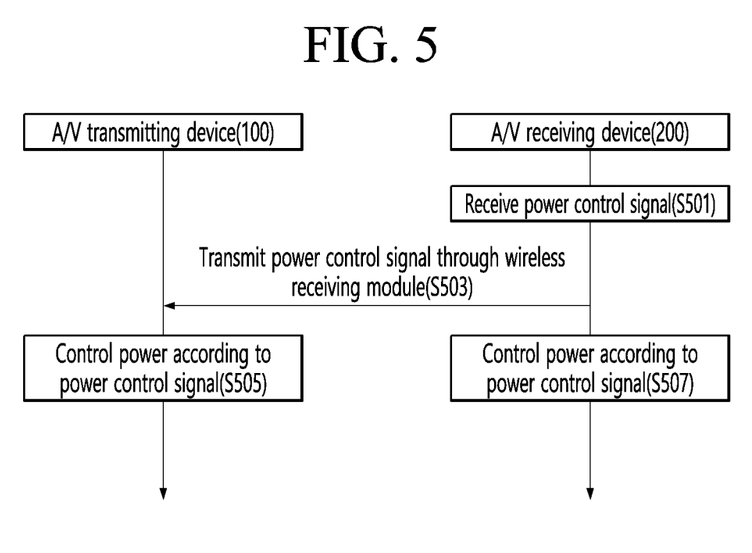
FIG. 5 is a ladder diagram for describing a method of operating a wireless display system according to an embodiment of the present disclosure.

FIG. 5 is a ladder diagram for describing a method of operating a wireless display system according to an embodiment of the present disclosure.

In particular, FIG. 5 is a diagram illustrating a process of synchronizing a power control signal with the A/V transmitting device 100, when the A/V receiving device 200 receives the power control signal from the remote control device 300.

Referring to FIG. 5, the microcomputer 290 of the A/V receiving device 200 receives the power control signal from the remote control device 300 through the IR receiving module 230 (S501).

In an embodiment, the power control signal may be a signal for turning on power.

In another embodiment, the power control signal may be a signal for turning off power.

The IR receiving module 230 of the A/V receiving device 200 may receive the power control signal from the IR module 313 of the remote control device 300.

In another embodiment, the Bluetooth module 220 of the A/V receiving device 200 may receive the power control signal from the BLE module 311 of the remote control device 300.

The microcomputer 290 of the A/V receiving device 200 transmits the received power control signal to the A/V transmitting device 100 through the wireless receiving module 270 (S503).

The RF transmitting module 150 of the A/V transmitting device 100 may transmit A/V data to the RF receiving module 240 of the A/V receiving device 200 through a first frequency band. The first frequency band may be 60 GHz.

The microcomputer 290 of the A/V receiving device 200 may transmit the power control signal to the A/V transmitting device 100 through a second frequency band. The second frequency band may be 2.4 GHz.

To this end, the wireless receiving module 270 may include an RF module for the frequency band of 2.4 GHz. The RF module may include one or more antennas.

The wireless transmitting module 170 of the A/V transmitting device 100 which receives the power control signal may also include an RF module including one or more antennas.

The wireless receiving module 270 may transmit the power control signal to the wireless transmitting module 170, for synchronization.

The processor 190 of the A/V transmitting device 100 controls power thereof according to the received power control signal (S505).

When the power control signal is a power on signal, the processor 190 may turn on power of the A/V transmitting device 100.

When the power control signal is a power off signal, the processor 190 may turn off power of the A/V transmitting device 100.

At the same time, the microcomputer 290 of the A/V receiving device 200 controls power thereof according to the power control signal (S507).

The microcomputer 290 of the A/V receiving device 200 may control power thereof, for power control and synchronization of the A/V transmitting device 100. That is, the microcomputer 290 may turn on power thereof when the power control signal is a power on signal and turn off power thereof when the power control signal is a power off signal.

The microcomputer 290 of the A/V receiving device 200 may control power thereof after transmitting the power control signal to the A/V transmitting device 100, in order to synchronize power control timing of the A/V transmitting device 100 and power control timing thereof as much as possible.

According to the embodiment of the present disclosure, according to the power control signal of the remote control device 300, power of the A/V transmitting device 100 and the A/V receiving device 200 may be simultaneously controlled.

A user may simultaneously control power of two devices by only one input through the remote control device 300 without two inputs, thereby improving convenience.

Figure 6:
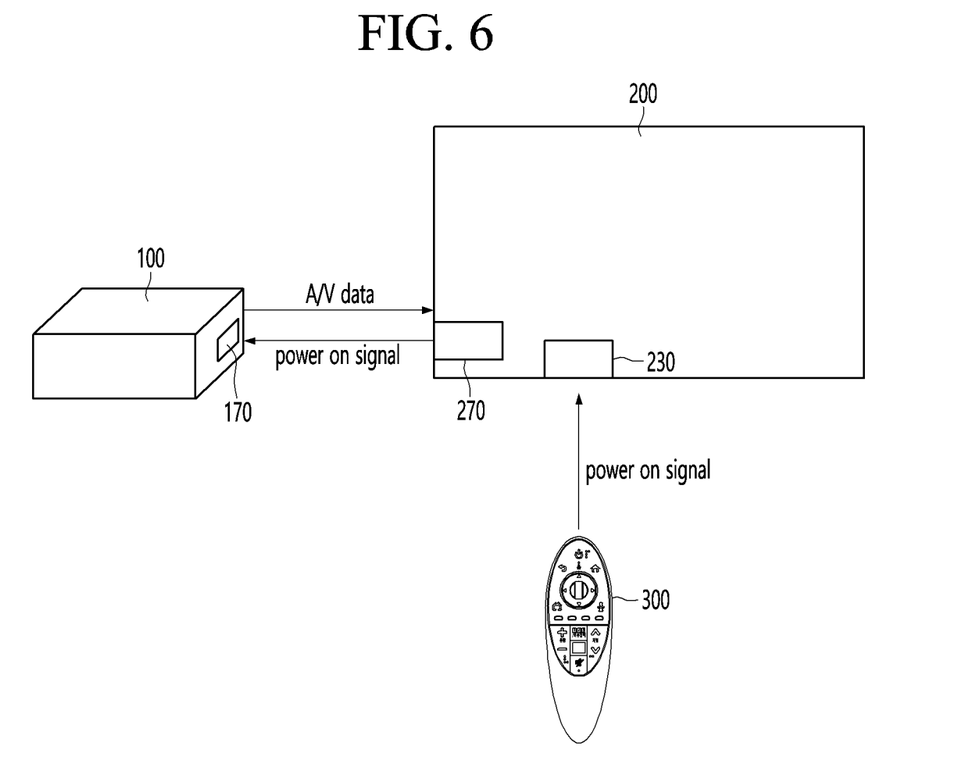
FIG. 6 is a view illustrating a process of performing synchronization of power control with an A/V transmitting device, as an A/V receiving device receives a power control signal, according to an embodiment of the present disclosure.

FIG. 6 is a view illustrating a process of performing synchronization of power control with an A/V transmitting device, as an A/V receiving device receives a power control signal, according to an embodiment of the present disclosure.

In FIG. 6, it is assumed that power of each of the A/V transmitting device 100 and the A/V receiving device 200 is turned off.

Referring to FIG. 6, the IR module 230 of the A/V receiving device 200 may receive a power on signal from the remote control device 300.

The IR module 230 may transmit the power on signal to the microcomputer 290, and the microcomputer 290 may transmit the power on signal to the wireless receiving module 270.

The wireless receiving module 270 may transmit the power on signal to the wireless transmitting module 170 of the A/V transmitting device 100.

The A/V transmitting device 100 may be turned on according to the received power on signal, and, at the same time, the A/V receiving device 200 may also be turned on.

Accordingly, the user may simultaneously turn on two devices by one power input through the remote control device 300, thereby increasing convenience.

Figure 7:
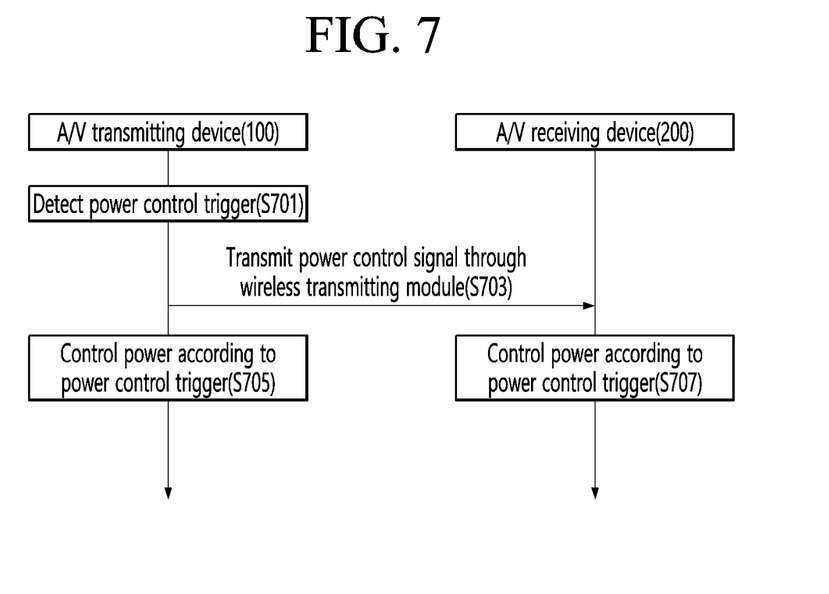
FIG. 7 is a ladder diagram illustrating a method of operating a wireless display system according to another embodiment of the present disclosure.

FIG. 7 is a ladder diagram illustrating a method of operating a wireless display system according to another embodiment of the present disclosure.

In particular, FIG. 7 is a diagram illustrating a method of synchronizing a power control trigger with the A/V receiving device 200 when the A/V transmitting device 100 receives the power control trigger.

The processor 190 of the A/V transmitting device 100 detects the power control trigger (S701).

In an embodiment, the power control trigger may turn on power. That is, the power control trigger may switch the power off state of the A/V transmitting device 100 and the A/V receiving device 200 to a power on state.

In an embodiment, the A/V transmitting device 100 may further include an external input interface (not shown). The external input interface may provide a connection path with an external device and receive one or more a video signal or an audio signal from the external device.

The external input interface may include one or more HDMI terminals, but this is only an example.

When the processor 190 is connected to the external device through the external input interface, it may be determined that the power control trigger is detected.

That is, the processor 190 may determine that the power control trigger is detected, when a detection signal of the external device is detected through the external input interface.

In another embodiment, the processor 190 may receive the power control signal from a mobile terminal of a user through the Wi-Fi module 120 or the Bluetooth module 130.

For example, the processor 190 may determine that the power control trigger is detected when receiving a power on signal from the mobile terminal.

The processor 190 of the A/V transmitting device 100 transmits the power control trigger to the wireless receiving module 270 of the A/V receiving device 200 through the wireless transmitting module 170 (S703).

The processor 190 may transmit, to the wireless receiving module 270, the power control trigger for turning on power of the A/V receiving device 200 through the wireless transmitting module 170.

The processor 190 of the A/V transmitting device 100 turns on power thereof according to the power control trigger (S705).

The microcomputer 290 of the A/V receiving device 200 turns on power thereof according to the power control trigger (S707).

In an embodiment, the processor 190 may turn on power thereof after transmitting the power control trigger to the A/V receiving device 200, in order to match power on of the A/V receiving device 200 as much as possible.

Figure 8:
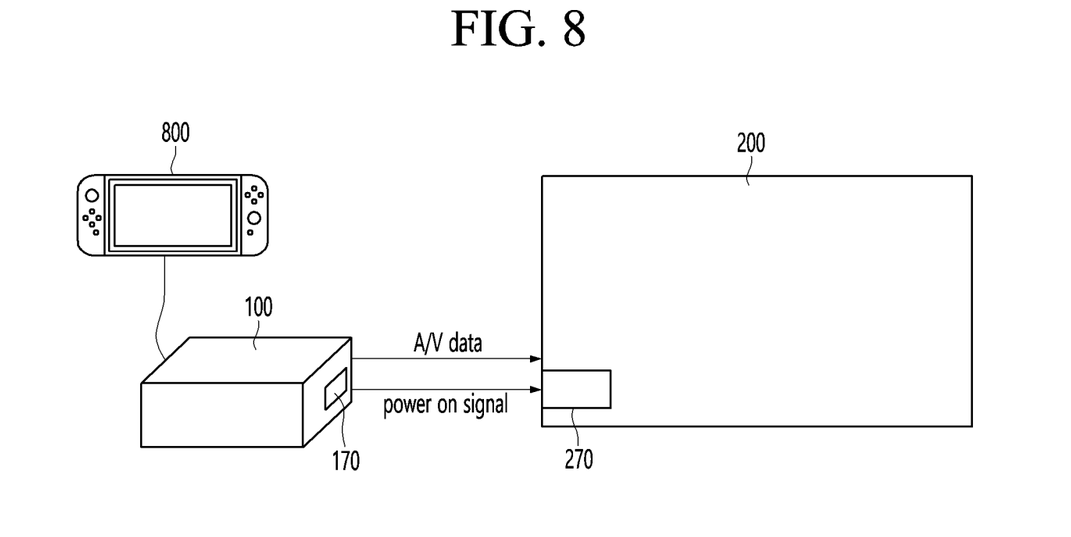
FIGS. 8 and 9 are diagrams illustrating a process of synchronizing power between an A/V transmitting device and an A/V receiving device, as the A/V transmitting device receives a power control trigger, according to an embodiment of the present disclosure.
Figure 9:
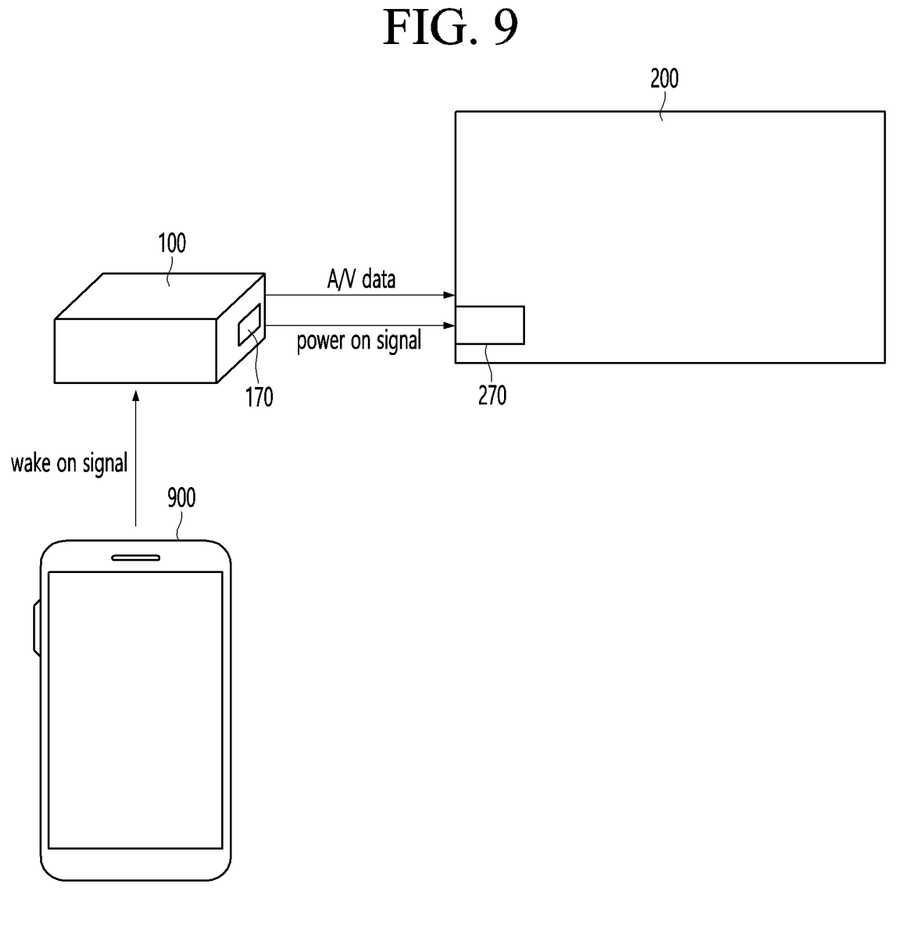

FIGS. 8 and 9 are diagrams illustrating a process of synchronizing power between an A/V transmitting device and an A/V receiving device, as the A/V transmitting device receives a power control trigger, according to an embodiment of the present disclosure.

First, FIG. 8 will be described.

Referring to FIG. 8, the A/V transmitting device 100 may be connected to a game console 800 through an external input interface (not shown).

When the game console is connected, the A/V transmitting device 100 may detect it as a power control trigger and transmit a power on signal to the wireless receiving module 270 of the A/V receiving device 200 through the wireless transmitting module 170.

The A/V transmitting device 100 may turn on power thereof according to detection of the power control trigger.

The A/V receiving device 200 may turn on power thereof according to the power on signal received through the wireless receiving module 270.

When power of each of the A/V transmitting device 100 and the A/V receiving device 200 is turned on, preparation for A/V data transmission and reception may be completed.

That is, when power of each of the A/V transmitting device 100 and the A/V receiving device 200 is turned on, power may be applied to the RF transmitting module 150 and the RF receiving module 240.

Therefore, the A/V transmitting device 100 may transmit A/V data received from the game console 800 to the RF receiving module 240 through the RF transmitting module 150.

According to the embodiment of the present disclosure, when an external device is connected to the A/V transmitting device 100, power of each of the A/V transmitting device 100 and the A/V receiving device 200 may be turned on.

Accordingly, the user does not need to perform separate remote control input, thereby greatly improving operation convenience of the device.

Next, FIG. 9 will be described.

Referring to FIG. 9, the A/V transmitting device 100 may be connected to a mobile terminal 900 through a wireless network. For example, the A/V transmitting device 100 may be connected to the mobile terminal 900 through the Wi-Fi standard.

The A/V transmitting device 100 may receive a wake on signal according to the Wake-on-LAN standard from the mobile terminal 900.

In another embodiment, the A/V transmitting device 100 may receive a wake on signal from a router relaying communication with the mobile terminal 900.

A wake-on-LAN is an Ethernet computer networking standard that turns on power of the A/V transmitting device 100 or wakes it up from a sleeping mode, by transmitting a network message.

When the wake on signal is received from the mobile terminal 900, the A/V transmitting device 100 may determine that the power control trigger is detected.

The A/V transmitting device 100 may transmit a power on signal to the wireless receiving module 270 of the A/V receiving device 200 through the wireless transmitting module 170, as the power control trigger is detected.

Power of the A/V transmitting device 100 may be turned on according to the wake on signal received from the mobile terminal 900, and power of the A/V receiving device 200 may also be turned on according to the power on signal received from the A/V transmitting device 100.

According to the embodiment of the present disclosure, when the A/V transmitting device 100 receives the wake on signal according to the wake-on-LAN standard, power of each of the A/V transmitting device 100 and the A/V receiving device 200 may be turned on.

Accordingly, the user does not need to perform separate remote control input, thereby greatly improving operation convenience of the device.

Figure 10:
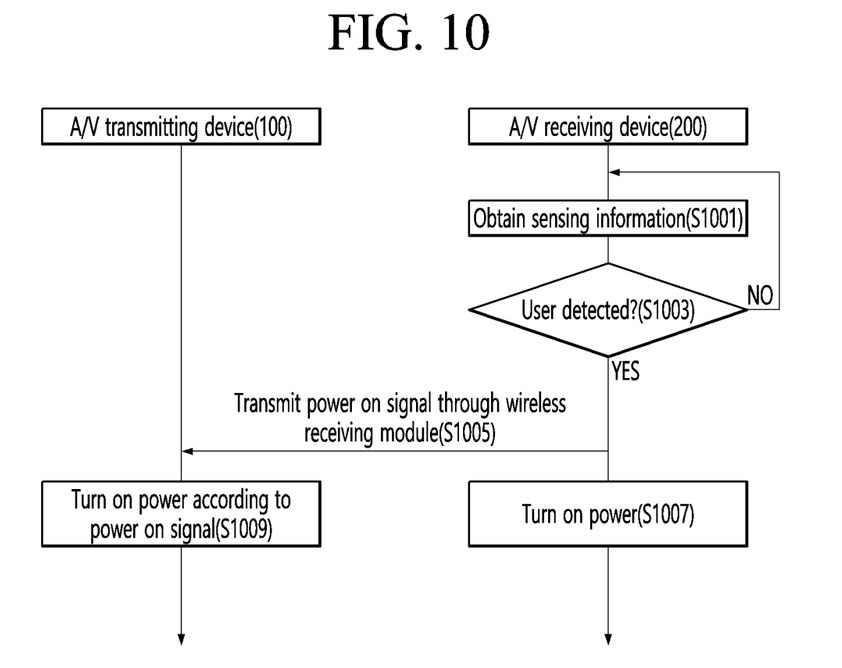
FIG. 10 is a ladder diagram illustrating a method of operating a wireless display system according to another embodiment of the present disclosure.

FIG. 10 is a ladder diagram illustrating a method of operating a wireless display system according to another embodiment of the present disclosure.

Referring to FIG. 10, the microcomputer 290 of the A/V receiving device 200 obtains sensing information (S1001).

In an embodiment, the A/V receiving device 200 may further include a sensor (not shown) for detecting a user.

For example, the sensor may be any one of a lidar sensor, an infrared sensor, or an ultrasonic sensor.

The sensor may be attached to a front surface of the display 260 of the A/V receiving device 200.

The lidar sensor may be a sensor for transmitting light having a specific pattern, extracting a feature of a reflected signal, and detecting a user.

The microcomputer 290 of the A/V receiving device 200 determines whether the user is detected based on the obtained sensing information (S1003).

For example, the microcomputer 290 may detect the user based on the feature of the reflected signal received from the lidar sensor. For example, the microcomputer 290 may determine that the user is detected, when the feature of the reflected signal is a preset pattern.

Upon determining that the user is detected, the microcomputer 290 of the A/V receiving device 200 transmits the power on signal to the A/V transmitting device 100 through the wireless receiving module 270 (S1005).

The microcomputer 290 of the A/V receiving device 200 turns on power thereof after transmitting the power on signal through the wireless receiving module 270 (S1007).

The A/V transmitting device 100 turns on power thereof according to the power on signal received from the A/V receiving device 200 (S1009).

Figure 11:
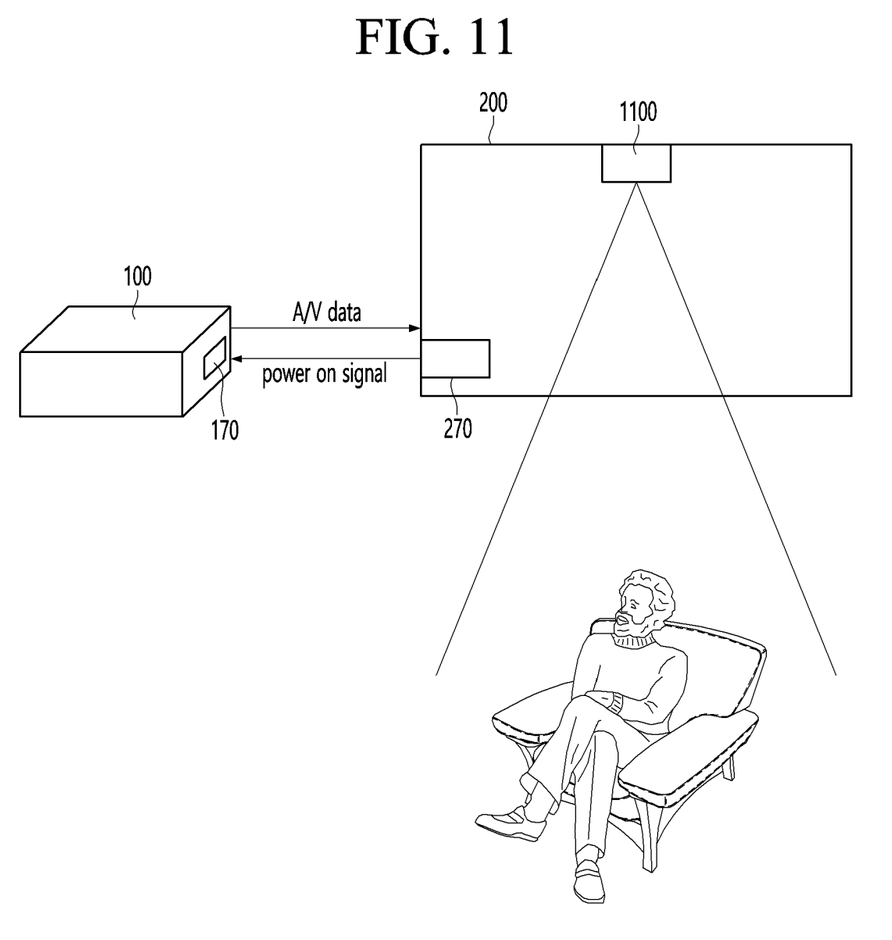
FIG. 11 is a diagram illustrating a process of automatically turning on power of each of an A/V transmitting device and an A/V receiving device when a user is detected, according to an embodiment of the present disclosure.

FIG. 11 is a diagram illustrating a process of automatically turning on power of each of an A/V transmitting device and an A/V receiving device when a user is detected, according to an embodiment of the present disclosure.

The A/V receiving device 200 may include a lidar sensor 1100. The lidar sensor 1100 may transmit light having a specific pattern and receive a reflected signal.

The A/V receiving device 200 may extract a feature of the received reflected signal and determine that a user is detected when the extracted feature is a preset pattern.

When the user is detected, the A/V receiving device 200 may turn on power thereof and transmit a power on signal to the wireless transmitting module 170 of the A/V transmitting device 100 through the wireless receiving module 270. Accordingly, power of the A/V transmitting device 100 may also be turned on.

According to an embodiment of the present disclosure, it is possible to automatically turn on power of the wireless display system, as the user is detected.

Accordingly, the user does not need to perform separate input, thereby greatly improving operation convenience of the wireless di splay system.

According to an embodiment of the present disclosure, a user may simultaneously control power of two wireless devices by only one input through the remote control device without two inputs, thereby improving convenience.

According to an embodiment of the present disclosure, the user does not need to perform separate remote control input, thereby greatly improving operation convenience of a wireless display system.

According to an embodiment of the present disclosure, the above-described method may be implemented with codes readable by a processor on a medium in which a program is recorded. Examples of the medium readable by the processor include a ROM (Read Only Memory), a Random Access Memory (RAM), a CD-ROM, a magnetic tape, a floppy disk, an optical data storage device, and the like.

The A/V transmitting device described above is not limitedly applicable to the configuration and method of the above-described embodiments, and the embodiments are configured by selectively combining all or part of each of the embodiments such that various modifications can be made.

What is claimed is:

1. An Audio/Video (A/V) receiving device comprising:
a Radio Frequency (RF) receiving module configured to receive A/V data from an A/V transmitting device through a first frequency band;
an infrared (IR) module configured to receive a power control signal from a remote control device;
a wireless receiving module configured to communicate with a wireless transmitting module of the A/V transmitting device through a second frequency band; and
a microcomputer configured to:
receive a power off control signal from the remote control device;
transmit the power off signal to the wireless transmitting module through the wireless receiving module to cause the wireless transmitting module to power off; and
turn off power of the A/V receiving device according to the power control signal received from the remote control device after transmitting the power off signal to the wireless transmitting module.

2. The A/V receiving device of claim 1, wherein the wireless receiving module is an RF module including one or more antennas.

3. The A/V receiving device of claim 1, wherein the first frequency band is 60 GHZ and the second frequency band is 2.4 GHz.

4. The A/V receiving device of claim 1, wherein the microcomputer is configured to receive the A/V data from the A/V transmitting device through the RF receiving module while power of the A/V transmitting device is turned on.

5. An Audio/Video (A/V) transmitting device comprising:
a Radio Frequency (RF) transmitting module configured to transmit A/V data to an A/V receiving device through a first frequency band;
an external input interface configured to receive a video signal from an external device;
a wireless transmitting module configured to communicate with a wireless receiving module of the A/V receiving device through a second frequency band; and
a processor configured to:
detect connection of the external device to the external input interface as a power control trigger;
turn on power of the A/V transmitting device in response to detecting the power control trigger; and
transmit a power on signal to the wireless receiving module through the wireless transmitting module in response to detecting the power control trigger.

6. The A/V transmitting device of claim 5, further comprising a Wi-Fi module for Wi-Fi communication with a mobile terminal,
wherein the processor is further configured to determine that the power control trigger is detected, when receiving a wake on signal according to a wake-on-LAN standard from the mobile terminal.

7. The A/V transmitting device of claim 5, further comprising a sensor configured to obtain sensing information,
wherein the processor is further configured to determine that the power control trigger is detected, upon determining that a user is detected from the obtained sensing information.

8. The A/V transmitting device of claim 7,
wherein the sensor is a lidar sensor configured to transmit light having a specific pattern and to receive a reflected signal, and
wherein the processor determines that the user is detected when the reflected signal has a preset pattern.

9. The A/V transmitting device of claim 5, wherein the wireless transmitting module is an RF module including one or more antennas.

10. The A/V transmitting device of claim 5, wherein the first frequency band is 60 GHZ and the second frequency band is 2.4 GHz.

11. The A/V transmitting device of claim 5, wherein the processor transmits the A/V data to the A/V receiving device through the RF transmitting module, after power of the RF transmitting module is turned on.

* * * * *